(12) United States Patent
Gregg et al.

(10) Patent No.: US 9,476,369 B2
(45) Date of Patent: Oct. 25, 2016

(54) VARIABLE POWER OUTPUT AND MAXIMUM SPEED IN DRIVE MODE

(71) Applicant: Toyota Motor Engineering & Manufacturing North America, Inc., Erlanger, KY (US)

(72) Inventors: Christopher Gregg, Gardena, CA (US); Hidetoshi Kusumi, Gardena, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 915 days.

(21) Appl. No.: 13/678,438

(22) Filed: Nov. 15, 2012

(65) Prior Publication Data

US 2013/0275023 A1    Oct. 17, 2013

Related U.S. Application Data

(60) Provisional application No. 61/624,104, filed on Apr. 13, 2012.

(51) Int. Cl.
*F02D 28/00* (2006.01)
*F02D 11/10* (2006.01)
*F02D 41/24* (2006.01)

(52) U.S. Cl.
CPC ............. *F02D 28/00* (2013.01); *F02D 11/105* (2013.01); *F02D 41/2422* (2013.01); *F02D 2200/60* (2013.01); *F02D 2200/604* (2013.01); *F02D 2200/606* (2013.01)

(58) Field of Classification Search
CPC .. F02D 28/00; F02D 11/105; F02D 2200/60; F02D 2200/604; F02D 2200/606; F02D 41/2422
See application file for complete search history.

(56) References Cited

U.S. PATENT DOCUMENTS

| 4,729,356 | A | * | 3/1988 | Kaneko | F02D 11/105 123/361 |
|---|---|---|---|---|---|
| 4,735,181 | A | * | 4/1988 | Kaneko | F02D 11/105 123/361 |
| 4,898,138 | A | * | 2/1990 | Nishimura | F02D 41/2496 123/399 |
| 5,189,621 | A | * | 2/1993 | Onari | B60K 31/0008 123/480 |
| 6,044,318 | A | * | 3/2000 | Bourdon | F02D 41/2422 123/399 |
| 6,428,444 | B1 | | 8/2002 | Tabata | |

(Continued)

OTHER PUBLICATIONS

Azure Dynamics Inc. , DMOC445 and DMOC645 User Manual for Azure Dynamics DMOC Motor Controller Man-080001-001, Dec. 2009.*

(Continued)

*Primary Examiner* — Hieu T Vo
*Assistant Examiner* — Sherman Manley
(74) *Attorney, Agent, or Firm* — Snell & Wilmer LLP

(57) ABSTRACT

A variable power drive mode system for a vehicle. The system includes a pedal, a processor, an engine or other vehicle power source for moving the vehicle and a battery. The processor of the vehicle determines, either automatically or based upon user input, a desired drive mode for the vehicle. A memory connected with the processor stores different data corresponding to the different drive modes determinable by the processor for the vehicle. The processor uses the different data stored in memory in combination with a position of the pedal to control the engine or other vehicle power source to generate power in accordance with the determined drive mode. Certain drive modes may provide for more aggressive driving profiles at the expense of fuel efficiency or fuel consumption when compared to other drive modes.

21 Claims, 4 Drawing Sheets

(56) References Cited

U.S. PATENT DOCUMENTS

| | | | |
|---|---|---|---|
| 6,524,216 B2 | 2/2003 | Suzuki et al. | |
| 6,912,451 B2* | 6/2005 | Poteet | H02J 3/06 290/51 |
| 7,487,851 B2 | 2/2009 | Buck et al. | |
| 7,678,005 B2 | 3/2010 | Tuckfield | |
| 7,775,191 B2 | 8/2010 | Hou | |
| 2002/0165658 A1* | 11/2002 | Ament | F02D 11/105 701/110 |
| 2004/0074682 A1 | 4/2004 | Fussey et al. | |
| 2006/0048516 A1 | 3/2006 | Tenbrock et al. | |
| 2006/0048988 A1 | 3/2006 | Dreibholz et al. | |
| 2008/0114521 A1* | 5/2008 | Doering | B60W 30/16 701/96 |
| 2009/0112439 A1* | 4/2009 | Kuang | B60W 30/188 701/99 |
| 2009/0267037 A1* | 10/2009 | Johnson | H02G 1/02 254/134.3 PA |
| 2009/0312895 A1 | 12/2009 | Kim et al. | |
| 2010/0059300 A1* | 3/2010 | Brown | B60L 15/20 180/65.285 |
| 2010/0082192 A1 | 4/2010 | Hofbauer | |
| 2011/0004363 A1* | 1/2011 | Severinsky | B60H 1/004 701/22 |
| 2011/0114403 A1* | 5/2011 | Hauger | B60K 6/387 180/65.25 |
| 2011/0192662 A1 | 8/2011 | Hennings et al. | |
| 2011/0307130 A1 | 12/2011 | Gow et al. | |
| 2012/0325042 A1* | 12/2012 | Takiguchi | B60W 10/06 74/513 |
| 2013/0297185 A1* | 11/2013 | Morris | F02D 11/105 701/104 |
| 2013/0317718 A1* | 11/2013 | Sato | F02D 11/105 701/70 |

OTHER PUBLICATIONS

Azure Dynamics Inc., Pedal Controlled Application User Manual for Azure Dynamics DMOC Motor Controller Man-080002-001, Dec. 2009.*

"Pedal Controlled Application User Manual for Azure Dynamics DMOC Motor Controller"; Azure Dynamics, Inc.; 28 pages; Dec. 2009.

* cited by examiner

VARIABLE POWER OUTPUT AND MAXIMUM SPEED IN DRIVE MODE

CROSS REFERENCE TO RELATED APPLICATIONS

This application claims the benefit and priority of U.S. Provisional Application No. 61/624,104, filed on Apr. 13, 2012, the entire contents of which are hereby incorporated by reference.

BACKGROUND

1. Field

The present invention relates generally to vehicle drive mode systems and improvements thereof. More particularly, the present invention relates to variable power output systems and methods for an automobile or other vehicle based upon a selectable drive mode and improvements thereof.

2. Description of the Related Art

As the cost of fuel and electricity continues to rise, consumers of automobiles or other vehicles that utilize such fuel or electricity for power generation expect ever increasing fuel efficiency from their operation. One manner of approaching these expectations is through the design of engines or power sources that are capable of only a reduced amount of maximum output power. This has conventionally been attained through the use of power sources having fewer engine cylinders and/or cylinders with a smaller volume for air/fuel combustion in order to consume lower amounts of gasoline. Similarly, hybrid or other electric vehicles may utilize smaller and/or weaker electric motors that do not consume as much electricity and produce lower amounts of peak output power.

Unfortunately, by designing for lower maximum power in order to achieve lower fuel consumption, vehicles may be viewed as underpowered or undesirable in the eyes of many consumers. Indeed, peak horsepower or torque remains a large selling point for vehicle performance. In addition to the extra exhilaration such higher power output can provide, vehicles must also have sufficient power for safety purposes, such as for safely merging or maneuvering on high speed roadway systems. Not only is sufficient power output important, but conventional vehicles can also suffer from a reduction in peak power based upon the operation or characteristics of other vehicle systems or components, such as battery charge level. Consumers desire flexibility in their vehicles when it comes to fuel consumption versus power and also expect their vehicles to behave consistently upon pressing their foot against the accelerator pedal. Any deviations from normal or expected acceleration due to other systems can result in frustration or anxiety when a driver may not be aware of the reasoning or engineering causing the vehicle's apparent reduction in power. Thus, a vehicle system or method is desired that would allow for both high output power and also lower fuel consumption with consistent driver feel.

Ideally, a power generation system or method of a vehicle would be capable of controlling an engine or other power source of the vehicle according to a variety of different power configurations. The power generation system or method would ideally allow for the engine or power source to have a large maximum power output, but operate with lower fuel consumption depending upon vehicle characteristics or user preference. The power generation system or method would also ideally help maintain a feeling of predictable power output for a user of the vehicle and would ideally be inexpensive to manufacture and integrate with other systems or components of the vehicle.

SUMMARY

A system or method for varying power of a power source of a vehicle according to a selectable drive mode of the vehicle is described. In one embodiment, a system to control power generation for a vehicle may include a pedal and a processor coupled with the pedal and configured to determine a position of the pedal. A power source is coupled with the processor and configured to generate power based on the position of the pedal, the power source being controlled by the processor. A memory is coupled with the processor for storing data, the data including a first set of data corresponding to a first drive mode, the first set of data configured to limit the power generated by the power source to a first threshold. The data also includes a second set of data corresponding to a second drive mode, the second set of data configured to limit the power generated by the power source to a second threshold. The data also includes a third set of data corresponding to a third drive mode, the third set of data configured to permit the power generated by the power source to be greater than the second threshold.

In another embodiment, a system for managing power generation of a vehicle may include a pedal, a processor connected with the pedal for determining a configuration of the pedal, an engine controlled by the processor for generating power based on the configuration of the pedal and a battery connected with the engine. A memory is coupled with the processor for storing a data map, the data map including first data associated with a first drive mode and configured to limit the power generated by the engine to a first threshold. The data map also includes second data associated with a second drive mode and configured to limit the power generated by the engine to a second threshold. The data map also includes third data associated with a third drive mode and configured to allow the engine to generate power up to the maximum power achievable by the engine. A user control is connected with the processor for allowing a user of the vehicle to select the first drive mode, the second drive mode or the third drive mode.

In still another embodiment, a method for controlling power generated by a power source of a vehicle, the vehicle having a processor and a memory connected with the processor. The method may include the steps of storing a first set of data in the memory corresponding to a first drive mode, storing a second set of data in the memory corresponding to a second drive mode, and storing a third set of data in the memory corresponding to a third drive mode, determining, using the processor, a position of a pedal of the vehicle, determining, using the processor, if the first drive mode, the second drive mode or the third drive mode is selected, controlling, using the processor, the power source of the vehicle to generate power based on the first set of data and the position of the pedal of the vehicle when the first drive mode for the vehicle is selected, controlling, using the processor, the power source of the vehicle to generate power based on the second set of data and the position of the pedal of the vehicle when the second drive mode for the vehicle is selected, and controlling, using the processor, the power source of the vehicle to generate power based on the third set of data and the position of the pedal of the vehicle when the third drive mode for the vehicle is selected.

BRIEF DESCRIPTION OF THE DRAWINGS

Other systems, methods, features, and advantages of the present invention will be or will become apparent to one with skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

Figure 1:
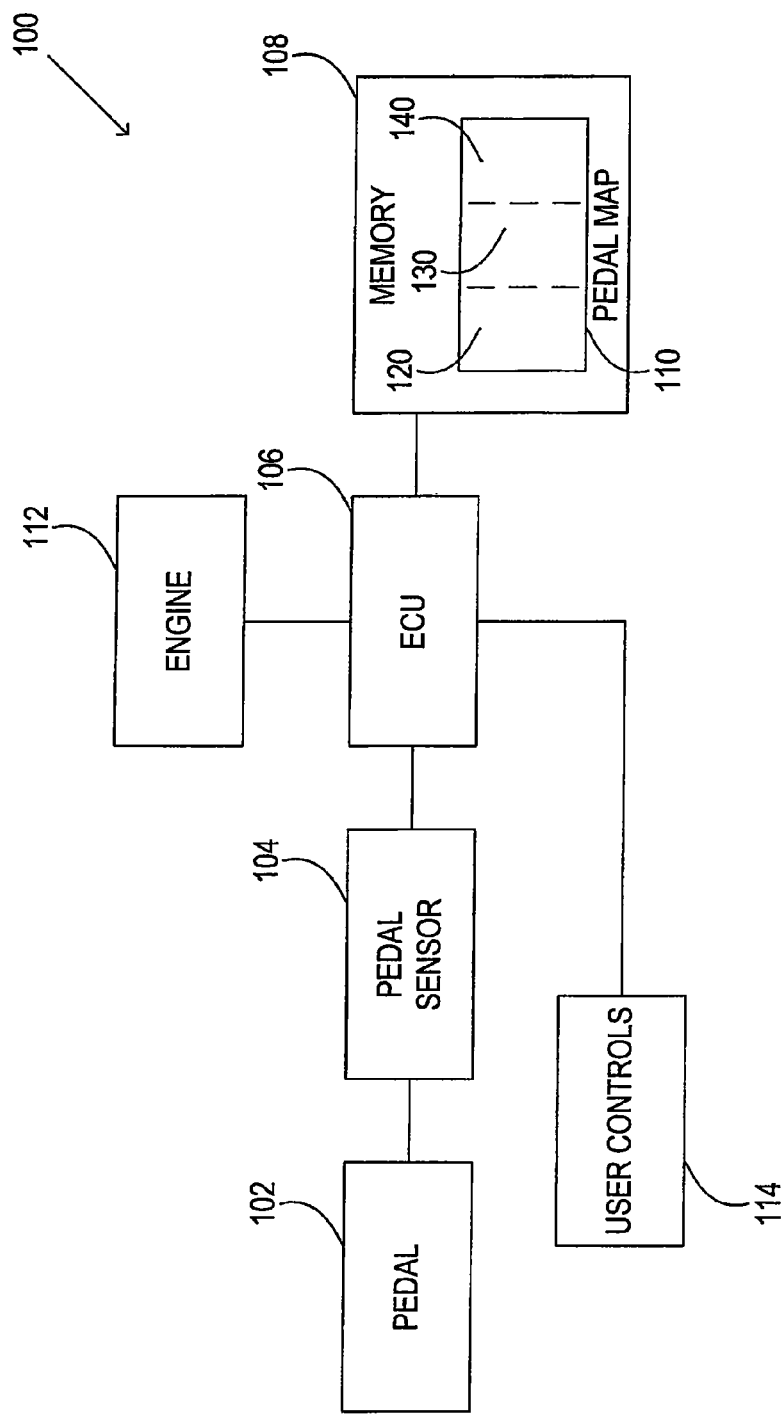
FIG. 1 is a block diagram of a drive mode system for a vehicle utilizing variable power output according to an embodiment of the present invention.

Referring to FIG. 1, a block diagram is shown of a drive mode system 100 for a vehicle utilizing variable power output in order to allow for improved driving range or fuel efficiency. The drive mode system 100 includes a pedal 102 (e.g., an accelerator pedal), a pedal sensor 104 connected with the pedal 102 and an engine control unit ("ECU") 106 or other processor connected with the pedal sensor 104. When a user of the vehicle manipulates the position of the pedal 102 (e.g., by exhibiting a downward force with their foot when operating the vehicle), the movement or change in physical position, angle or configuration of the pedal 102 is sensed or otherwise determined by the pedal sensor 104. For example, the pedal 102 may have an at-rest position corresponding to times when the user is not manipulating the pedal 102. The pedal 102 may also have a maximum displacement position corresponding to times when the user has manipulated the pedal 102 as far as the pedal 102 is mechanically allowed to move. The ECU 106 can thus receive such positional information via one or more signals from the pedal sensor 104 in order to determine the precise positioning of the pedal 102. In an alternative embodiment, the ECU 106 or other processor may be directly connected with the pedal 102 or a component of or connected with the pedal 102 such that no pedal sensor is needed.

The ECU 106 is also connected with a memory 108 of the vehicle. The memory 108 stores, inter alia, a pedal map 110. The pedal map 110 may be a table, database, or other listing or compilation of data for relating a position of the pedal 102 to one or more associated engine parameters or characteristics. For example, the pedal map 110 may contain data that indicates an engine should receive a first (e.g., a small) intake of air and/or fuel for combustion when the pedal 102 is at a position when no downward force acts upon it (e.g., the at-rest position discussed above). In another example, the pedal map 110 may also contain data that indicates the engine should receive a second (e.g., a large) intake of air and/or fuel for combustion when the pedal 102 is at a position corresponding to the maximum displacement position from its at-rest position by the user of the vehicle. In an alternative embodiment, the pedal map 110 may relate pedal position to other characteristics of the vehicle or its components, such as electric power from a motor or a battery in a hybrid or electric vehicle.

Thus, by determining the position of the pedal 102 via the pedal sensor 104, the ECU 106 interfaces with the pedal map 110 stored in the memory 108 to control one or more aspects of an engine 112 or other power source of the vehicle. The engine 112 may be any form of automotive or vehicular engine or motor utilizing any of a variety of fuel sources and is not limited to only conventional gasoline combustion engines. For example, the engine may be a diesel engine, a hybrid motor, an electric drive motor, a fuel-cell based engine or motor, etc. In conventional automotive systems, only one pedal map 110 may be used for look-up by the ECU 106 or other processor of the automobile or may contain only one set of pedal positioning data. However, the drive mode system 100 utilizes a plurality of data sets or algorithms (120, 130, 140), as discussed in greater detail herein for providing for varying aspects, parameters or characteristics for the engine 112, depending upon a desired or selected drive mode for the vehicle.

The desired drive mode for the vehicle may be set by the user of the vehicle via manipulation of one or more user controls 114. The user controls 114 connect with the ECU 106 so that the ECU 106 may determine or look up the appropriate data set or algorithm (120, 130, 140) of the pedal map 110 to utilize when interfacing with the engine 112. The user controls 114 may include knobs, buttons, touch-screen displays, microphones interfacing with voice-recognition software, or any other type of user manipulatable control such that the user of the vehicle may indicate the desired drive mode for the vehicle.

In one embodiment, the vehicle may be configured to have three different drive modes. Each drive mode may utilize a different data set or algorithm in the pedal map 110 for controlling the ratio of pedal position to engine power output. A first drive mode (e.g., an Eco mode) may be selected by the user via the user controls 114. In one embodiment, the first drive mode operates to limit power or torque characteristics for the engine 112 to a certain threshold or percentage of maximum engine output. Such limiting can improve a driving range of the vehicle and/or fuel efficiency of the vehicle. In one example, the pedal map 110 may have a first drive mode mapping 120 with data configured to provide a reduced maximum output from the engine 112 equal to only eighty percent (80%) of the engine 112 maximum power or torque output. In an alternative embodiment, the threshold or percentage of maximum engine output may be chosen to be any value or plurality of values as desired.

In yet another embodiment, the first drive mode operates to limit an acceleration rate of the vehicle to only what is achievable at a fifty percent (50%) charge level of a battery of the vehicle. By limiting this output power generated by the engine 112, the changing operational performance of the engine 112 as the battery depletes is less noticeable to the user. Instead of providing higher operational performance of the engine 112 when the battery has greater than a fifty percent (50%) state of charge and subsequently lower operational performance when the battery is at or under a fifty percent (50%) state of charge, the engine 112 is limited to only generate power up to the lower operational performance threshold regardless of the battery state of charge. Thus, the pedal map 110 may have a first drive mode mapping 120 with data configured to provide a reduced maximum output from the engine 112 equal to only what is achievable when the battery of the vehicle is at a fifty percent (50%) state of charge. A lower maximum speed while in the first drive mode may also be obtained compared to other driving modes, as discussed in greater detail herein.

In other embodiments, the charge state level or percentage of the battery for defining the operational performance may be chosen to be any value or plurality of values as desired.

A second drive mode (e.g., a Normal mode) may be selected by the user via the user controls 114, the same as or similar to the discussion above. The second drive mode operates to limit power or torque characteristics for the engine 112 to a certain threshold or percentage of maximum engine output. Such limiting can improve a driving range of the vehicle and/or fuel efficiency of the vehicle. In one example, the pedal map 110 may have a second drive mode mapping 130 with data configured to provide a reduced maximum output from the engine 112 equal to only eighty percent (80%) of the engine 112 maximum power or torque output. An increased maximum speed compared to the first drive mode may be obtained in the second drive mode. In an alternative embodiment, the threshold or percentage of maximum engine output may be chosen to be any value or plurality of values as desired.

A third drive mode (e.g., a Sport mode) may be selected by the user via the user controls 114, the same or similar as previously discussed. The third drive mode operates to allow for a hundred percent (100%) of the available power and/or torque of the engine 112. By not limiting power or torque, the user of the vehicle can obtain increased performance and higher maximum speed from the vehicle for enjoyment purposes or for situations where full vehicle power is otherwise desired (e.g., when towing, when the vehicle is weighed down by luggage or a large number of passengers, etc.). Thus, the pedal map 110 may have a third drive mode mapping 140 with data configured to provide an aggressive non-linear pedal relationship and increased output when the pedal 102 is fully displaced (e.g., at full throttle). An increased maximum speed compared to the first drive mode and the second drive mode may also be obtained. In an alternative embodiment, the allowed power and/or torque of the engine may be chosen to be any value or plurality of values as desired.

In certain embodiments, a default drive mode may be enabled or chosen automatically upon start-up of the vehicle. For example, the default mode may be a Normal drive mode to provide a user with a balance of vehicle performance and fuel efficiency. In another embodiment, the drive mode system 100 may store in the memory 108 a preferred drive mode of the user or may store in the memory 108 the last used drive mode by the user. This stored mode may then be automatically set as the default drive mode upon start-up of the vehicle. In yet another embodiment, the drive mode may be set automatically based upon other vehicle or driving characteristics (e.g., determination of which user is driving the car via key fob detection or cabin settings, determination of the weather or surrounding environment of the vehicle, determination of the fuel level of the vehicle, etc.).

Figure 2:
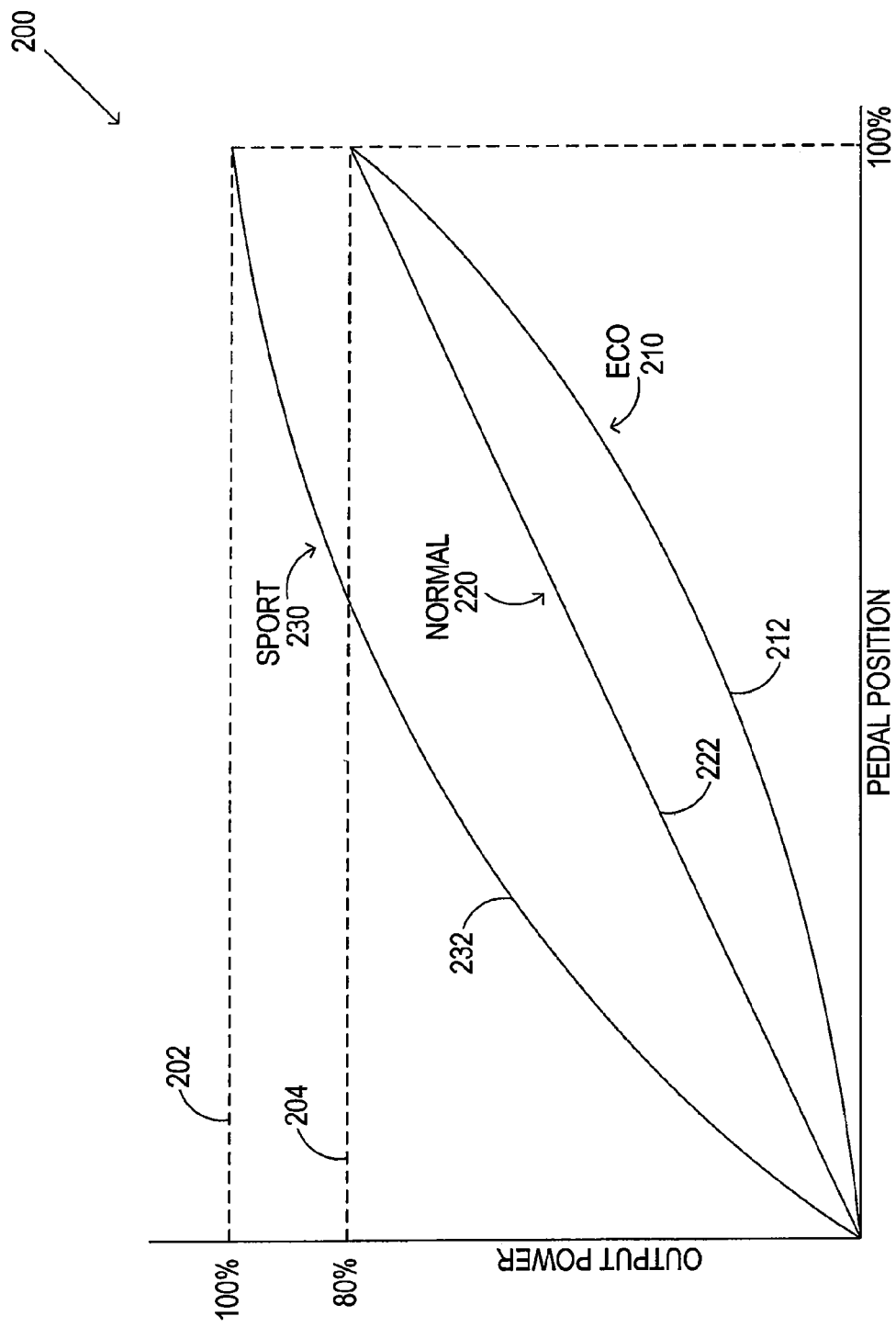
FIG. 2 is a graph showing variable power output based upon pedal position for a drive mode system of a vehicle according to an embodiment of the present invention.

FIG. 2 is a graph of a drive mode system 200 of a vehicle showing variable power output from an engine based upon pedal position. The drive mode system 200 may incorporate certain structural or functional features that are the same as or similar to the drive mode system 100 of FIG. 1. Output power in percentage of maximum output power for an engine of the vehicle is shown on the y-axis while pedal position for a pedal of the vehicle is shown on the x-axis. The drive mode system 200 shown by the graph includes a plurality of different drive modes. A first drive mode may be an Eco mode 210. A second drive mode may be a Normal mode 220. A third drive mode may be a Sport mode 230. Each of the three drive modes (210, 220, 230) has different operational characteristics for the output power of the engine of the vehicle in relation to the pedal position. The three drive modes (210, 220, 230) may be the same as or similar to the drive modes previously discussed for FIG. 1.

The Eco mode 210 may be configured to have a non-linear rise in output power with respect to pedal position which provides a smooth and/or predictable rate of acceleration for the vehicle as shown in FIG. 2. For example, in the Eco mode 210, the Eco mode power curve 212 may exhibit a non-linear relationship existing between the pedal position and the output power of the vehicle and may additionally be configured to limit the output power to a first threshold which may be a percentage (e.g., 80%) of the maximum power achievable by the power source when the battery has a full charge level. In an alternative embodiment, any of a variety of threshold percentages may be used in place of or in addition to eighty percent (80%). In another embodiment, the first threshold may be a maximum power achievable by the power source for a predetermined charge level (e.g., a 50% state of charge) of the battery of the vehicle. In another alternative embodiment, the output power may be limited to the power achievable when the vehicle is operating under an alternative condition rather than state of battery charge.

In one embodiment, the Normal mode 220 may be configured to have a linear rise in output power (e.g., with a steeper slope than the initial slope of the Eco mode power curve 212) with respect to pedal position for providing a smooth and/or predictable rate of acceleration for the vehicle. Thus, the Normal mode power curve 222 may exhibit a linear relationship between the pedal position and the output power of the vehicle. The Normal mode 220 may additionally be configured to limit the output power to the predetermined threshold or percentage 204 (e.g., 80%) of the maximum output power capability for the engine of the vehicle. In an alternative embodiment, any of a variety of threshold values or percentages of maximum output power for the engine of the vehicle may be used in place of or in addition to the eighty percent (80%) threshold. In other embodiments, the predetermined threshold or percentage when operating under the Normal mode 220 may be different from the predetermined threshold or percentage when operating under the Eco mode 210.

Under the Sport mode 230, the Sport mode power curve 232 may be configured to have a non-linear rise in output power with respect to pedal position for providing an aggressive and/or more sensitive rate of acceleration for the vehicle. Thus, the Sport mode power curve 232 may exhibit a non-linear relationship existing between the pedal position and the output power of the vehicle. The Sport mode 230 does not place any limits on the output power that is capable of being generated by the engine. Thus, the Sport mode 230 allows the output power to reach the maximum output power 202 which may be a hundred percent (100%) of the output power available from the engine. Without such limits, the vehicle can reach enhanced performance in the Sport mode 230.

The functional performance for the engine of the vehicle due to the drive modes (210, 220, 230) may be due to data configurations of a pedal map for adjusting the pedal position to output power ratio. For example, a first set of data of the pedal map may correspond to the Eco mode 210 and thus is configured to limit the maximum output power of the engine to a first threshold which may be a percentage (e.g., 80%) of the maximum power achievable by the power source when the battery has a full charge level. In another embodiment, the first threshold may be a maximum power achievable by the power source for a predetermined charge level (e.g., a 50% state of charge) of the battery of the vehicle. A second set of data of the pedal map may correspond to the Normal mode 220 and thus is configured to limit the output power of the engine to eighty percent (80%) of the maximum output power. A third set of data of the pedal map may correspond to the Sport mode 230 and thus is configured to not limit the maximum output power of the engine. In another embodiment, the Eco mode power curve 212 may be configured to have a linear rise in output power with respect to pedal position without limiting the scope of the present invention. In yet another embodiment, the Normal mode power curve 222 may be configured to have a non-linear rise in output power with respect to pedal position which provides a smooth and/or predictable rate of acceleration for the vehicle.

Figure 3:
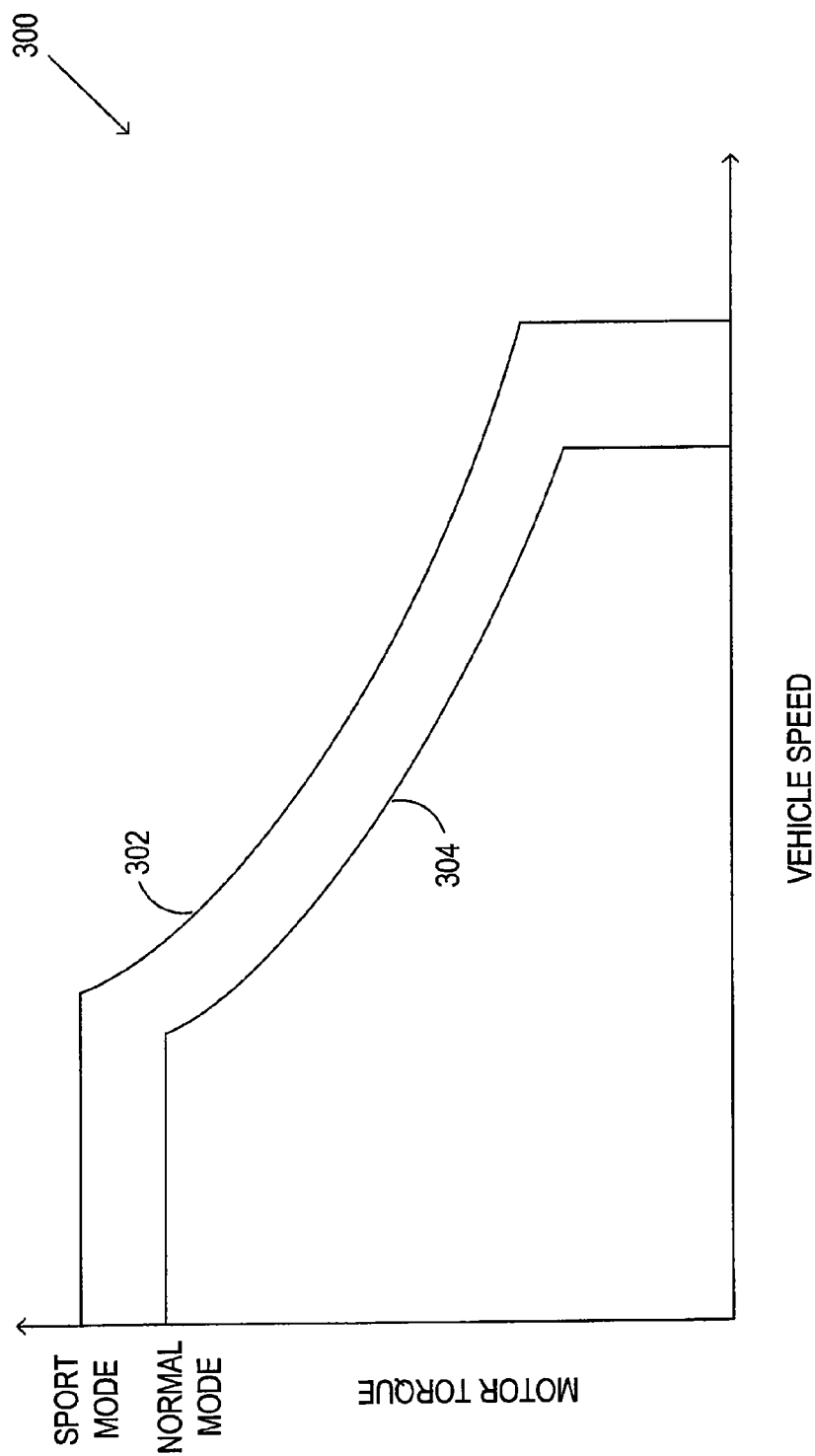
FIG. 3 is a graph showing torque versus speed curves for a drive mode system of a vehicle according to an embodiment of the present invention.

FIG. 3 shows a graph of a drive mode system 300 for a vehicle demonstrating two curves, one representing a Sport mode 302 for the vehicle and a second representing a Normal mode 304 for the vehicle. The drive mode system 300 may include certain structural or functional features that are the same as or similar to the systems previously discussed in FIGS. 1-2. Performance or drivability characteristics may change or be modified depending upon operation of the vehicle in the Sport mode 302 or the Normal mode 304. For example, when in the Sport mode 302, the vehicle is capable of an increased maximum torque and/or an increased maximum speed when compared to a maximum torque and/or maximum speed of the Normal mode 304. Thus, a user may set the vehicle to operate in Normal mode 304 for everyday driving and switch to Sport mode 302 when at a racetrack or other situation where increased performance from the vehicle is desired. In an alternative embodiment, different performance curves may be established for either of the Sport mode 302 or the Normal mode 304 as desired.

Figure 4:
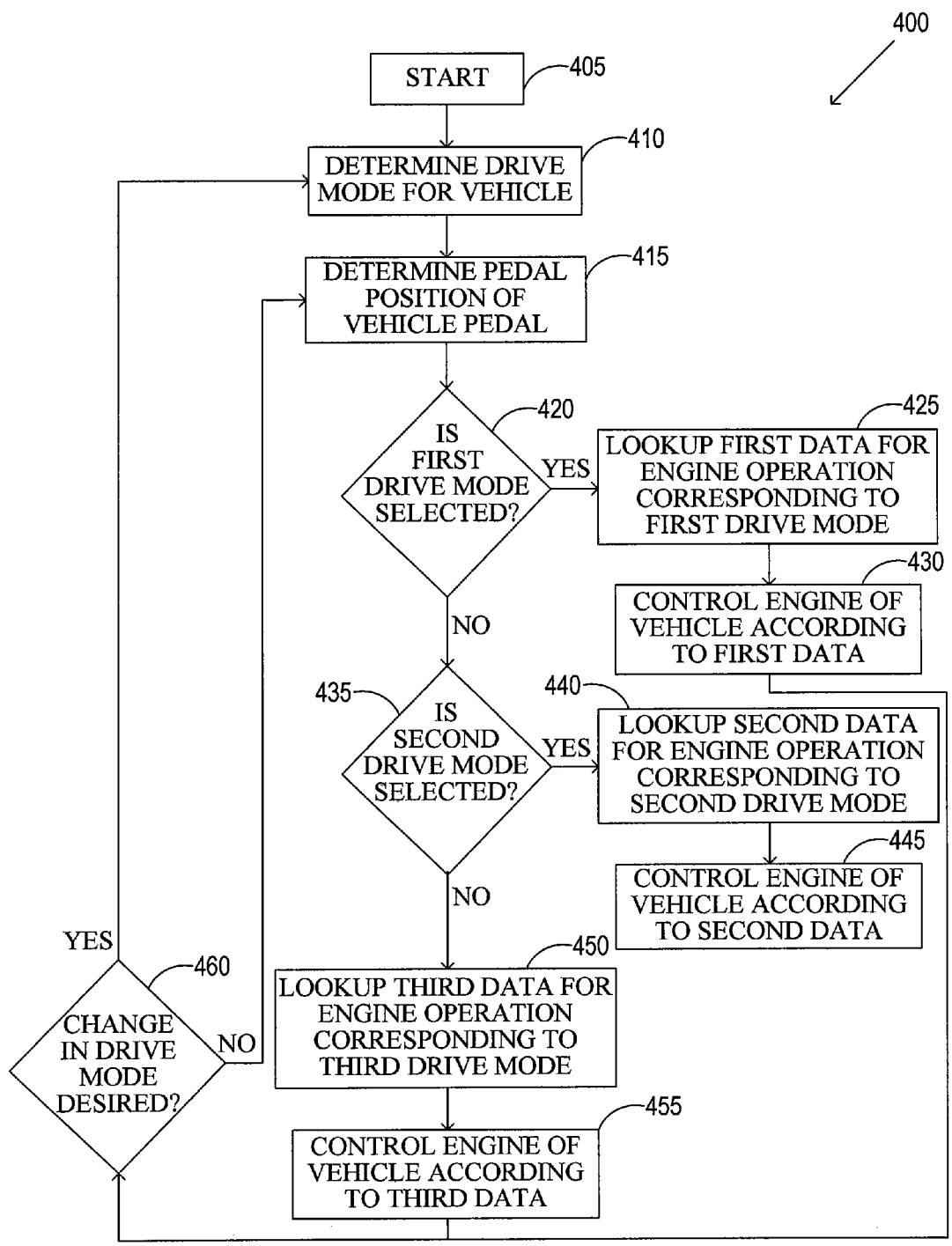
FIG. 4 is a flowchart for a drive mode system of a vehicle according to an embodiment of the present invention.

FIG. 4 shows a flowchart of a drive mode system 400 for a vehicle that controls power generated by a power source depending upon the current drive mode selected for the vehicle. The drive mode system 400 may incorporate certain of the same or similar functional and/or structural features as previously described for FIGS. 1-3. For example, one or more of the process steps shown in the flowchart of the drive mode system 400 may be performed by a processor of the vehicle that is connected with or configured to receive information from a memory of the vehicle. At step 405, the process starts, for example, when a user of the vehicle turns on a power source (e.g., an engine or electric motor) of the vehicle or puts the vehicle into a forward driving mode or gear.

The process next continues to step 410 where the processor of the drive mode system 400 determines a current drive mode for the vehicle. This may be accomplished by interfacing with user controls (e.g. the user controls 114 of FIG. 1) or any other system or components of the vehicle that allow the user of the vehicle to choose or select a desired mode of operation of the vehicle. In certain embodiments, the processor of the vehicle may choose or select a drive mode automatically instead of requiring user input. For example, the processor may receive a signal from a sensor configured to detect weather conditions surrounding the vehicle (e.g., rain, snow, ice, etc.), road conditions (e.g., slippage of the tires on the roadway, etc.) or other characteristics of the vehicle (e.g., is the vehicle towing an object, is the vehicle suffering from a mechanical or electrical problem or defect, etc.) and automatically determine a preferred drive mode for the vehicle in response to the signal from the sensor. Such operation may improve the safety or drivability of the vehicle by allowing the processor to choose a drive mode configured for a lower output power from the power source if weather, road or other characteristics so oblige.

At step 415, the processor determines a position of a pedal (e.g., an accelerator pedal) of the vehicle for use in controlling a power output from an engine, as discussed in greater detail herein. At step 420, based upon the determination of the drive mode (see step 410), the processor checks if a first drive mode is selected. If so, operation continues to step 425. At step 425, the processor looks up a set of first data for controlling engine operation in the memory that correspond to the first drive mode. For example, the set of first data may be configured to prevent power generated by the engine from being greater than a first threshold which may be a percentage (e.g., 80%) of the maximum power achievable by the power source when the battery has a full charge level. In another embodiment, the first threshold may be a maximum power achievable by the power source for a predetermined charge level (e.g., a 50% state of charge) of the battery of the vehicle. Operation then continues to step 430 where the processor controls the engine of the vehicle to generate or output power based upon the set of first data looked up at step 425 and based upon the position of the pedal determined at step 415. Thus, both the position of the pedal and the set of first data in the memory govern or regulate the amount of power that is output by the engine of the vehicle when in the first drive mode. Operation next continues to step 460, as discussed in greater detail herein.

If the first drive mode is not selected (see step 420), then operation continues to step 435. At step 435, based upon the determination of the drive mode (see step 410), the processor checks if a second drive mode is selected. If so, operation continues to step 440. At step 440, the processor looks up a set of second data for controlling engine operation in the memory that correspond to the second drive mode. For example, the set of second data may be configured to prevent power generated by the engine from being greater than a second threshold, such as a predetermined portion of a maximum power achievable by the engine. The second threshold may or may not be equal to the first threshold. Operation then continues to step 445 where the processor controls the engine of the vehicle to generate or output power based upon the set of second data looked up at step 440 and based upon the position of the pedal determined at step 415. Thus, both the position of the pedal and the set of second data in the memory govern or regulate the amount of power that is output by the engine of the vehicle when in the second drive mode. Operation next continues to step 460, as discussed in greater detail herein.

If the second drive mode is not selected (see step 435), then operation continues to step 450. At step 450, the processor looks up a set of third data for controlling engine operation in the memory that correspond to a third drive mode. For example, the set of third data may be configured not to limit the power generated by the engine to a particular threshold. Operation then continues to step 455 where the processor controls the engine of the vehicle to generate or output power based upon the set of third data looked up at step 450 and based upon the position of the pedal determined at step 415. Thus, both the position of the pedal and the set of third data in the memory govern or regulate the amount of power that is output by the engine of the vehicle when in the third drive mode. Operation next continues to step 460.

At step 460, the processor determines whether a change in drive mode for the vehicle is desired. This may occur based off of user input (e.g., by receiving a signal at the processor when the user interfaces with or manipulates user controls of the vehicle) or may occur automatically without user input (e.g., by receiving a signal at the processor from a sensor or other system, such as indicating a weather condition, road condition, or other characteristic of the vehicle). If a change in drive mode is desired, operation continues to step 410 where a different drive mode for the vehicle is determined by the processor, the same or similar as previously discussed. However, if no change in drive mode is desired, operation instead continues to step 415 where the processor determines a pedal position of the pedal of the vehicle, the same or similar as previously discussed. Thus, the drive mode system 400 of the vehicle may continuously loop or operate while the engine of the vehicle is on. The drive mode system 400 may be disabled or reset when the engine of the vehicle is turned off or the vehicle is no longer in motion (e.g., the vehicle has been changed to a parked mode or gear).

An alternative embodiment of a drive mode system may utilize alternative process steps in addition to or in replacement of the process steps specifically outlined in the above embodiments (e.g., FIG. 4). An alternative embodiment may utilize greater or fewer process steps or with alternative ordering or flow than as previously discussed. For example, any number of drive modes with associated or corresponding data may be utilized. Moreover, an alternative embodiment may have varying operational functionality and/or utilize additional, alternative or fewer devices or systems for selecting or determining a drive mode for the vehicle or for controlling a power source of the vehicle.

The driving mode pedal algorithms or map data for varying the operational parameters of an engine of a vehicle as described in connection with the embodiments or examples disclosed above may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system to control power generation for a vehicle comprising:
a pedal configured to be positioned between a minimum position and a maximum position;
an input device configured to receive a selection of a first drive mode, a second drive mode or a third drive mode;
a power source configured to generate power; and
a processor coupled to the pedal, the input device and the power source and configured to control the power source to:
generate power at a first threshold when the pedal is positioned at the maximum position and the received drive mode is the first drive mode,
generate power at a second threshold when the pedal is positioned at the maximum position and the received drive mode is the second drive mode,
generate power at a third threshold that is greater than the second threshold when the pedal is positioned at the maximum position and the received drive mode is the third drive mode, and
provide a greater acceleration rate when the received drive mode is the second drive mode than when the received drive mode is the first drive mode for pedal positions greater than the minimum position and less than the maximum position.

2. The system of claim 1 further comprising a battery coupled to the power source and configured to store a charge, wherein an amount of power achievable by the power source when the charge of the battery is equal to a predetermined charge level is used as the first threshold.

3. The system of claim 2 wherein the power source includes at least one of an engine, an electric motor or an electric generator.

4. The system of claim 2 wherein an amount of power achievable by the power source when the battery is fully charged is used as the second threshold.

5. The system of claim 1 wherein the processor is configured to automatically select the first drive mode, the second drive mode or the third drive mode.

6. The system of claim 5 wherein the processor is configured to automatically select the first drive mode, the second drive mode or the third drive mode based on a characteristic of the vehicle.

7. The system of claim 5 wherein the processor is configured to automatically select the first drive mode, the second drive mode or the third drive mode based on a previous drive mode selected for the vehicle during a previous trip of the vehicle.

8. The system of claim 5 wherein the processor is configured to automatically select the first drive mode, the second drive mode or the third drive mode based upon a weather condition outside of the vehicle.

9. A system for managing power generation of a vehicle comprising:
a pedal configured to be positioned between a minimum position corresponding to a minimum power request and a maximum position corresponding to a maximum power request;
an input device configured to receive a selection of a first drive mode, a second drive mode or a third drive mode;
an engine configured to generate power; and
a processor coupled to the pedal, the input device and the engine and configured to control the engine to:
generate power at a first threshold when the pedal is positioned at the maximum position and the first drive mode is selected,
generate power at a second threshold corresponding to a percentage of a maximum power achievable by the engine that is less than 100 percent when the pedal is positioned at the maximum position and the second drive mode is selected,
generate power at a third threshold corresponding to the maximum power achievable by the engine when the pedal is positioned at the maximum position and the third drive mode is selected, and provide a greater acceleration rate when the received drive mode is the second drive mode than when the received drive mode is the first drive mode for pedal positions greater than the minimum position and less than the maximum position.

10. The system of claim 9 further comprising a battery coupled to the engine and to the processor and configured to store charge, wherein an amount of power that the engine can output when the charge level of the battery is 50% or less of a maximum charge level of the battery is used as the first threshold.

11. The system of claim 9 wherein the second threshold corresponds to 80% of the maximum power achievable by the engine.

12. The system of claim 9 wherein the processor is configured to control the engine to generate power based on a current position of the pedal using a non-linear relationship between the current position of the pedal and the power generated by the engine when the first mode is selected.

13. The system of claim 12 wherein the processor is configured to control the engine to generate power based on the current position of the pedal using a linear relationship between the current position of the pedal and the power generated by the engine when the second mode is selected.

14. The system of claim 13 wherein the processor is configured to control the engine to generate power based on the current position of the pedal using another non-linear relationship between the current position of the pedal and the power generated by the engine when the third mode is selected.

15. A method for controlling power generated by a power source of a vehicle comprising the steps of:

receiving, by an input device, a selection of a first drive mode, a second drive mode or a third drive mode;

determining, by a processor, that a pedal of the vehicle is at a maximum position corresponding to a maximum power request;

controlling, using the processor, the power source of the vehicle to generate power at a first threshold when the pedal is at the maximum position and the first drive mode for the vehicle is selected;

controlling, using the processor, the power source of the vehicle to generate power at a second threshold when the pedal is at the maximum position and the second drive mode for the vehicle is selected;

controlling, using the processor, the power source of the vehicle to generate power at a third threshold that is greater than the second threshold when the pedal is at the maximum position and the third drive mode for the vehicle is selected; and controlling, using the processor, the power source of the vehicle to provide a greater acceleration rate when the first drive mode for the vehicle is selected than when the second drive mode for the vehicle is selected for pedal positions greater than a minimum position and less than the maximum position.

16. The method of claim 15 wherein the second threshold is greater than the first threshold.

17. The method of claim 15 further comprising selecting, by the processor, the first drive mode, the second drive mode or the third drive mode based on at least one factor.

18. The method of claim 17 wherein the at least one factor includes at least one of a characteristic of the vehicle, a current weather condition or a previous selection of a mode.

19. The method of claim 18 wherein the second threshold corresponds to a percentage of a maximum power achievable by the power source.

20. A system to control power generation for a vehicle comprising:

a pedal;

a processor coupled with the pedal and configured to determine a position of the pedal;

a power source coupled with the processor and configured to generate power based on the position of the pedal, the power source controlled by the processor; and a memory coupled with the processor for storing data, the data including a first set of data corresponding to a first drive mode, the first set of data configured to limit the power generated by the power source to a first threshold, a second set of data corresponding to a second drive mode, the second set of data configured to limit the power generated by the power source to a second threshold greater than the first threshold, and a third set of data corresponding to a third drive mode, the third set of data configured to permit the power generated by the power source to be greater than the second threshold, wherein the processor is configured to automatically select the first drive mode, the second drive mode or the third drive mode based upon a weather condition outside of the vehicle.

21. A system for controlling power generation of a vehicle comprising:

a pedal configured to be positioned between a minimum position corresponding to a minimum power request and a maximum position corresponding to a maximum power request;

an input device configured to receive a selection of a first drive mode or a second drive mode;

a power source configured to generate power; and a processor coupled to the pedal, the input device and the power source and configured to control the power source to provide a greater acceleration rate when the received drive mode is the second drive mode than when the received drive mode is the first drive mode for pedal positions greater than the minimum position and less than the maximum position.

\* \* \* \* \*